US 8,630,162 B2

(12) United States Patent
Lu et al.

(10) Patent No.: US 8,630,162 B2
(45) Date of Patent: Jan. 14, 2014

(54) FAST FLOODING BASED FAST CONVERGENCE ARCHITECTURE

(75) Inventors: Wenhu Lu, San Jose, CA (US); Albert Jining Tian, Cupertino, CA (US); Sriganesh Kini, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 246 days.

(21) Appl. No.: 12/983,126

(22) Filed: Dec. 31, 2010

(65) Prior Publication Data

US 2012/0075986 A1    Mar. 29, 2012

Related U.S. Application Data

(60) Provisional application No. 61/387,511, filed on Sep. 29, 2010.

(51) Int. Cl.
*G01R 31/08* (2006.01)

(52) U.S. Cl.
USPC .......................................................... 370/216

(58) Field of Classification Search
None
See application file for complete search history.

(56) References Cited

U.S. PATENT DOCUMENTS

| | | | |
|---|---|---|---|
| 6,650,626 B1 | 11/2003 | Cain | |
| 6,871,235 B1 | 3/2005 | Cain | |
| 6,928,483 B1* | 8/2005 | Cain | 709/238 |
| 7,339,897 B2* | 3/2008 | Larsson et al. | 370/252 |
| 7,702,810 B1* | 4/2010 | Pan et al. | 709/242 |
| 7,860,024 B1* | 12/2010 | Greenberg et al. | 370/254 |
| 2002/0167900 A1* | 11/2002 | Mark et al. | 370/225 |
| 2004/0122976 A1 | 6/2004 | Dutta et al. | |
| 2006/0291391 A1* | 12/2006 | Vasseur et al. | 370/235 |
| 2007/0127395 A1 | 6/2007 | Jain et al. | |
| 2008/0037436 A1* | 2/2008 | Liu | 370/250 |
| 2008/0062862 A1 | 3/2008 | Goyal et al. | |
| 2008/0170550 A1 | 7/2008 | Liu et al. | |
| 2008/0279103 A1 | 11/2008 | Yong et al. | |
| 2009/0252033 A1 | 10/2009 | Ramakrishnan et al. | |
| 2011/0280123 A1 | 11/2011 | Wijnands et al. | |

FOREIGN PATENT DOCUMENTS

EP    1 107 507 A2    6/2001

OTHER PUBLICATIONS

Fast link state flooding Brad Cain IEEE Dec. 2000.*
Chain B.—Institute of Electrical and Electronics Engineers: "Fast Link State Flooding". GLOBECOM'OO. 2000 IEEE Global Telecommunications Conference. San Francisco. CA. Nov. 27-Dec. 1, 2000; New York. NY: IEEE. US. vol. 1. Nov. 27, 2000. pp. 465-469.
Francois et al. "Achieving Sub-Second IGP Convergence in Large IP Networks", ACM. 2 Penn Plaza. Suite 701—New York USA. Jul. 2, 2005.
Non-Final Office Action, U.S. Appl. No. 13/091,081, dated Jun. 24, 2013, 62 pages.

* cited by examiner

*Primary Examiner* — Chirag Shah
*Assistant Examiner* — Rina Pancholi
(74) *Attorney, Agent, or Firm* — Blakely Sokoloff Taylor & Zafman LLP

(57) ABSTRACT

Fast flooding based fast convergence to recover from a network failure. A router detects a network failure, and responsive to that failure, transmits a fast failure notification message to a set of one or more routers. The fast failure notification message includes information that identifies the network failure and also indicates that the fast failure notification message is to be flooded by the set of routers independently of convergence. The router updates a routing table to reflect the network failure. The transmission of the fast failure notification message is performed prior to completion of the routing table update to reflect the network failure.

15 Claims, 4 Drawing Sheets

FAST FLOODING BASED FAST CONVERGENCE ARCHITECTURE

CROSS-REFERENCE TO RELATED APPLICATIONS

This application claims the benefit of U.S. Provisional Application No. 61/387,511, filed Sep. 29, 2010, which is hereby incorporated by reference.

FIELD

Embodiments of the invention relate to the field of networking; and more specifically, to fast convergence from network failures.

BACKGROUND

The ability to recover rapidly from network failures is one of the most sought network characteristics. There are few solutions that address this issue to satisfaction. One such solution is IP Fast Re-Route (IPFRR) described in RFC (Request For Comments) 5714. IPFRR mimics the solution of MPLS-FRR (Multi-Protocol Label Switching-Fast Re-Route), with the exception that MPLS-FRR is path based, or source routing based in other words. This implies that the re-route decision can be carried out by the PLR (point-of-local-repair) router alone, without cooperation of other LSRs (Label Switched Routers) in the network. IP based FRR, however, is by nature not source routing based. As a result, its re-route decision may not be honored by other routers in the network which can lead to severe consequences such as traffic outage or routing loops.

There have been several methods proposed around the IPFRR concept. One method is LFA (Loop Free Alternative) described in RFC 5286. The LFA approach requires a great amount of computation and has coverage issues. Another method is Not-Via, described in IETF draft "draft-ietf-rtgwg-ipfrr-notvia-address-06", Oct. 21, 2010. The Not-Via approach is complicated and is prohibitive to be useful. The primary reason for difficulties in the approaches proposed around the IPFRR concept is evident from the following passage of RFC 5714, first paragraph, section 1: "However, there is an alternative approach, which is to compute backup routes that allow the failure to be repaired locally by the router(s) detecting the failure without the immediate need to inform other routers of the failure." The phrase "without the immediate need to inform other routers of the failure" is against the nature of the IP network in which the domain-wide synchronization is the key.

SUMMARY

A router for initiating fast flooding based fast convergence to recover from a network failure is described. In one embodiment, the router detects a network failure, and responsive to that failure, transmits a fast failure notification message to a set of one or more routers. The fast failure notification message includes information that identifies the network failure and also indicates that the fast failure notification message is to be flooded by the set of routers independently of convergence. The router updates a routing table to reflect the network failure. The transmission of the fast failure notification message is performed prior to completion of the routing table update to reflect the network failure.

In one embodiment, the router includes a data transport layer and an application layer. The data transport layer includes a Fast Failure Notification (FFN) module configured to, in response to a detected network failure, transmit a fast failure notification message to a set of one more routers. The fast failure notification message includes information that identifies the network failure and also indicates that the fast failure notification message is to be flooded by the set of routers independently of convergence. The application layer includes a routing protocol module that is configured to update a routing table in response to the detected network failure. The FFN module is further configured to transmit the fast failure notification message to the set of routers independently of the routing protocol module updating the routing table.

A router for participating in fast flooding based fast convergence to recover from a network failure is also described. The router receives a fast failure notification message that includes information that identifies a network failure and forwards that fast failure notification message to a set of one or more routers. The router also updates a routing table to reflect the network failure. The step of forwarding the fast failure notification message is performed before completion of the step of updating the routing table to reflect the network failure.

In one embodiment, the router includes a data transport layer and an application layer. The data transport layer includes a Fast Failure Notification (FFN) module configured to, in response to receipt of a fast failure notification message, transmit the fast failure notification message to a set of one or more routers and transmit the fast failure notification message to a routing protocol module on the application layer. The routing protocol module is configured to update a routing table in response to receiving the fast failure notification message from the FFN module. The FFN module is further configured to transmit the fast failure notification message to the set of routers independently of transmitting the fast failure notification message to the routing protocol module on the application layer.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
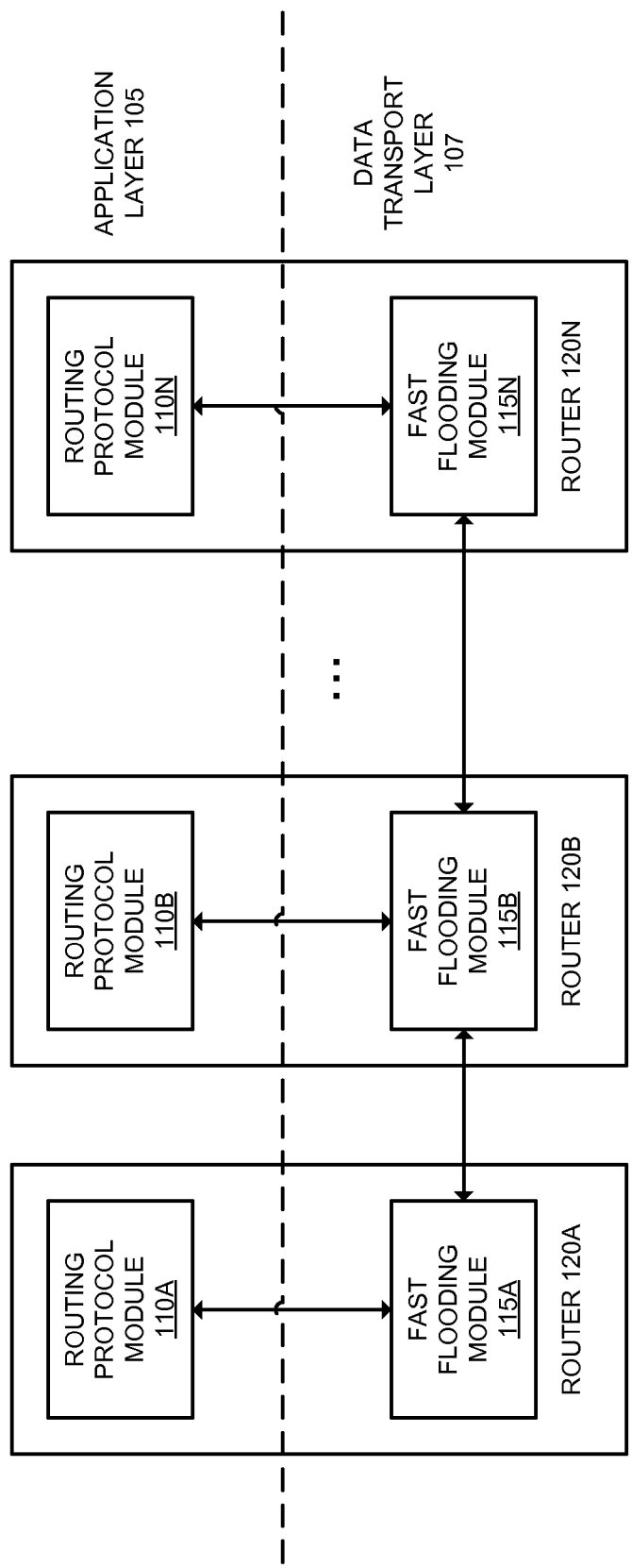
FIG. 1 illustrates a fast flooding based fast convergence (FFFC) architecture embodied on routers in a network according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A fast flooding based fast convergence (FFFC) architecture is described. The FFFC architecture minimizes the network downtime in the event of a network failure (e.g., upon a link or equipment failing). In one embodiment of the invention, the FFFC architecture uses an event framework for the purpose of rapid dissemination of events to all interested receivers in the network. The event framework is independent of the underlying delivery mechanisms. Thus, different delivery mechanisms with different properties suitable for different requirements may be used. For example, some delivery mechanism(s) that are optimized for simplicity may be used, while other delivery mechanism(s) that improve reliability may be used.

The event framework is application independent in that multiple different applications can generate the events and/or register to receive the events. In one embodiment, a TLV (type-length-value) based event framework is used to ensure between the applications and the delivery mechanisms. One example of an application using the event framework is a Fast Failure Notification. The Fast Failure Notification is used to improve network convergence time. For example, when a failure occurs in the network, routers adjacent to the failure can detect it and quickly disseminate the failure notifications to other routers throughout the area. Routing protocols (e.g., link state IGP (Interior Gateway Protocol) routing protocols such as OSPF (Open Shortest Path First) and Intermediate System to Intermediate System (IS-IS)) on different routers can register and receive such failure notifications, then quickly react to the failure to achieve fast convergence. The event in the Fast Failure notification is a link-down event or a node-down event. The up events (e.g., link-up or node-up) are not flooded for the same of network stability.

FIG. 1 illustrates a fast flooding based fast convergence (FFFC) architecture embodied on routers in a network according to one embodiment. The exemplary FFFC architecture is a layered structure in which various routing functions are arranged on each of the routers. As illustrated in FIG. 1, the FFFC architecture includes the application layer 105 and the data transport layer 107. The application layer 105 includes routing protocol specific functionality and is typically part of the control plane of the respective routers. The data transport layer 107 includes functionality for the fast flooding mechanism described herein and is typically part of the data plane of the respective routers. Specifically, the application layer 105 includes the routing protocol modules 110A-N on the routers 120A-N respectively, and the data transport layer 107 includes the fast flooding modules 115A-N on the routers 120A-N respectively.

The routing protocol modules 110A-N are registered to receive events from the fast flooding modules 115A-N respectively. In one embodiment, the fast flooding module allows a router 120 to disseminate a network failure notification to other router(s) 120 in the network, which can then forward to the corresponding routing protocol module 110 for further processing (e.g., updating the routing table and/or forwarding table). Thus, the fast flooding mechanism is detached from the application layer 105 and moved onto the data transport layer 107.

Although regular routing protocol processing for recovering from network failures, which performs flooding in a store-and-forward manner, is reliable (e.g., includes retransmission) and secure (e.g., includes an adjacency check), it involves control plane operation and control plane to data plane communication, which slows down the network-wide convergence. However, the FFFC architecture described herein detaches the flooding of the network failure notification from the application layer 105 and moves it onto the data transport layer 107. Thus, the data transport layer 107 provides domain-wide fast flooding platform. In one embodiment, the normal flooding function is still included in the application layer to ensure ultimate synchronization in case the fast flooding notifications do not reach the intended routers. The normal flooding function requires that the routing table and forwarding table be updated before a failure notification message is transmitted.

Figure 2:
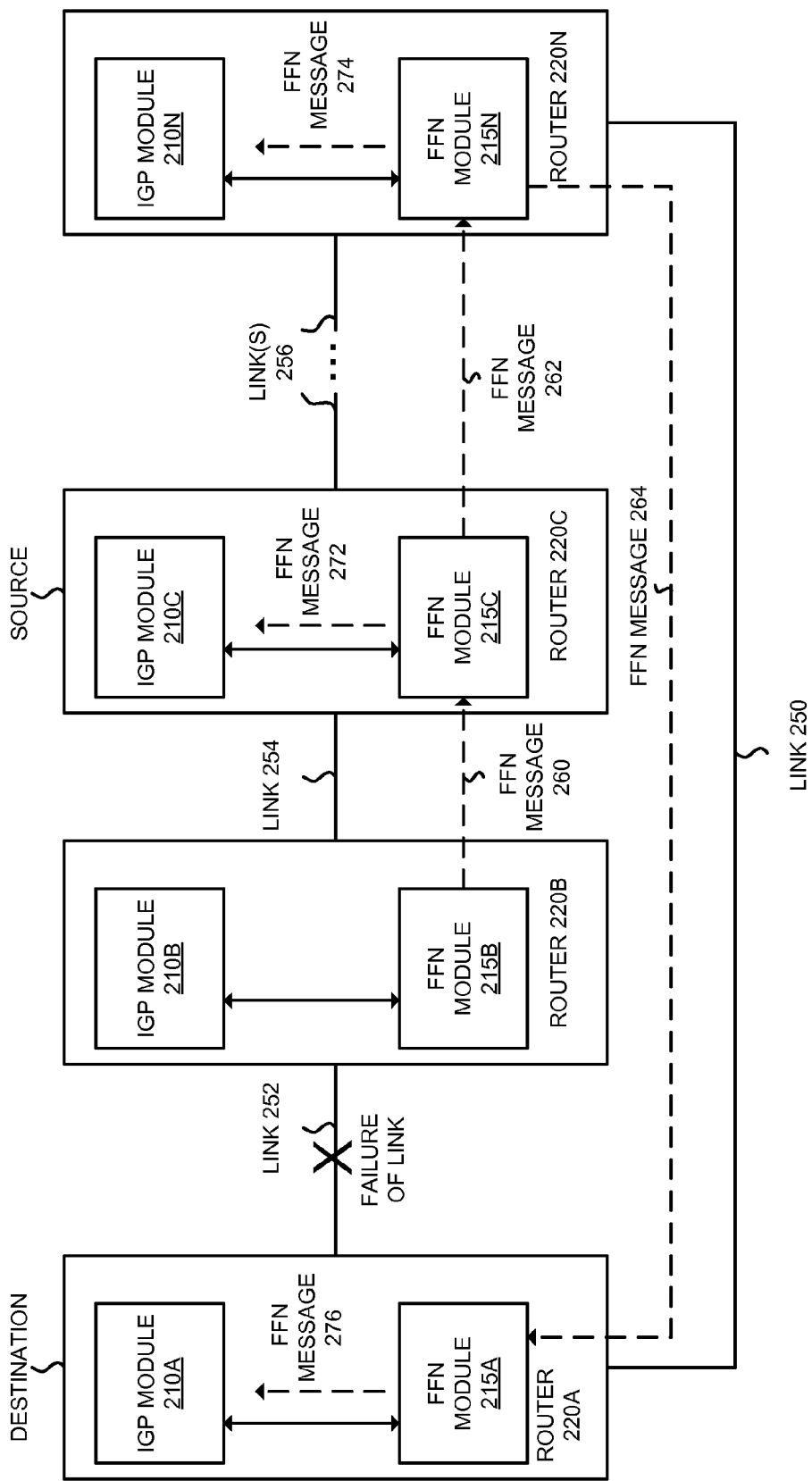
FIG. 2 illustrates an exemplary network using a Fast Failure Notification application that uses the FFFC architecture according to one embodiment

FIG. 2 illustrates an exemplary network using a Fast Failure Notification application that uses the FFFC architecture according to one embodiment. The exemplary network includes the routers 220A-N and form a ring topology. The router 220A and the router 220B are coupled by the link 252. The router 220B and the router 220C are coupled by the link 254. The router 220C and the router 220N are coupled by the link(s) 256 (there may be zero or more routers between the router 220C and the router 220N). The router 220N and the router 220A are coupled by the link 250. The routers 220A-N include the IGP module 210A-N and the Fast Failure Notification (FNN) module 215A-N respectively. The IGP modules 210A-N are part of the application layer of the routers 220A-N respectively and the FFN modules 215A-N are part of the data transport layer of the routers 220A-N respectively.

In the example illustrated in FIG. 2, the router 220C is the source of packets destined to the router 220A. During normal operation, the packets take the path from router 220C through the router 220B to reach the destination router 220A. As illustrated in FIG. 2, the network has experienced a network failure; specifically, the link 252 has failed. As a result, the router 220B cannot forward packets to the router 220A over the link 252. Thus, the packets from the router 220C will not reach the destination router 220A through the router 220B. However, the packets from the router 220C can reach the destination router 220A through the router 220N.

For purposes of explanation, the router 220B detects the failure of the link 252. It should be understood, however, that the router 220A may also detect the failure. The detection of the failure may be performed in different ways in different embodiments. In one embodiment, Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. The detection of the failure of the link 252 is an event in the event framework. Thus, a message is sent to the IGP module 210B that notifies the IGP module 210B of the failure of the link 252 and the IGP module 210B can update the routing table and forwarding table of the router 220B to reflect the failure of the link 252.

Since the router 220B detects the failure, in one embodiment it initiates the FFFC process and is the starting point for the fast failure notification message flooding. Thus, sometime after detecting the failure, the router 220B originates a fast failure notification message that indicates a failure on the link 252. The fast failure notification message is used to notify other routers that have registered to receive messages of that type of the failure. For example, the fast failure notification message indicates that there is a failure on the link 252. In addition, the fast failure notification message also indicates to the receiving routers that the fast flooding process should be performed including forwarding the fast failure notification message to their next hop(s) without waiting for convergence. For example, the fast failure notification message is to be forwarded by those router(s) without interaction from their application layer. For purposes of FIG. 2, each of the routers 220A-N have registered to receive fast failure notification messages.

In one embodiment, the fast failure notification message uses the existing IGP PDU (Protocol Data Unit) packet format. For example, if the IGP is OSPF, the OSPF Router-LSA (link state advertisement), which reflects a broken adjacency (one few router link) can be used as the fast failure notification message and fast-flooded to the routers without special modification. This allows the receivers, for example the routers 220A and 220C-N, to process the packet in their usual way. In addition, since the packet is not different than one used in normal flooding, it guarantees that the transition will be seamless when the normal flooding catches up to the fast flooding described herein. In addition, using the normal packet means that there will not be duplicate effort between fast and slow convergence. In other words, flooding stops wherever a router is updated (e.g., already fast flooded the fast failure notification message). However, using the existing IGP PDU packet format for the fast failure notification message means that the message cannot be made uniform for multiple protocols. For example, the existing IGP PDU packet format for OSPF is different than that of IS-IS. Thus, for IS-IS, a different format has to be used than for OSPF. In addition, since IS-IS PDU is not IP based, it may require encapsulation in some cases. Furthermore, one of the drawbacks is that the normal IGP flooding mechanism uses adjacency check to prevent a DoS (Denial of Service) attack or PDU replay from un-trusted parties. In order for the fast failure notification messages to be accepted, this adjacency check needs to be bypassed, which opens the door to DoS attacks or PDU replay attacks. However, domain-wide authentication may be used in order to protect against these types of attacks.

In another embodiment, the fast failure notification message uses a common message format regardless of protocol. This format allows for sufficient information about the failed link and is treated on the receiver router as a local event in the event framework described herein. In one embodiment, the uniform format is TLV-based. In one embodiment, timeout machinery is used to protect against cases where the fast failure notification message using a common message format is mistakenly flooded due to a bug or other error condition.

In one embodiment, the fast failure notification message includes a specific destination IP address or MAC address that indicates to the receiving routers that the message is for the FFFC architecture described herein.

After originating the fast failure notification message, the detecting router 220B floods the fast failure notification message. As illustrated in FIG. 2, the router 220B floods the fast failure notification message 260 to the router 220C over the link 254. This is conceptually illustrated as being sent from the FFN module 215B to the FFN module 215C. Any number of mechanisms to perform the fast flooding may be used. In one embodiment, the flooding mechanism that is used is reliable (it reaches all participants even after failures occur), loop-free, simple, and can be authenticated.

In one embodiment, the router 220B generates and transmits the fast failure notification message 260 before the router 220B has finished updating its routing and forwarding tables to reflect the failure of the link 252 (before it is converged). Thus, the router 220B generates and transmits the fast failure notification message independently of updating its routing and forwarding tables.

The receiving router 220C receives the fast failure notification message 260. The notification message 260 is an event in the event framework described herein and the IGP module 210C is registered to receive messages for the event. In one embodiment, the fast failure notification message 260 is identified as a message for the FFFC architecture based on it having a specific destination IP address or MAC address. Thus, after receiving the message, it forwards the fast failure notification message 272, which indicates a failure of the link 252, to its IGP module 210C so that the IGP module 210C can react to the failure and begin convergence processing. In one embodiment, the IGP module 210C relaxes its acceptance criteria of the message by foregoing the adjacency check. After receiving the fast failure notification message 272, the IGP module processes the message including updating the routing table and forwarding table as appropriate to reflect the failure of the link 252. In one embodiment, the changes are pre-downloaded to the data plane (e.g., in the forwarding table) to improve convergence time.

In addition to forwarding the fast failure notification message 272 to the IGP module 210C, the FFN module 215C floods a copy of the fast failure notification message. For exemplary purposes, the FFN module 215C floods the fast failure notification message 262 to the router 220N over the link 256. The fast failure notification message 262 can be sent before or concurrently with the fast failure notification message 272. Thus, the fast failure notification message 262 is flooded to the next router without any interaction with the IGP module 210C according to one embodiment, which reduces the convergence time.

The processing performed by the router 220N in response to receiving the fast failure notification message 262 is similar to the processing performed by the router 220C in response to receiving the fast failure notification message 260. The fast failure notification message 262 is an event in the framework that the IGP module 210N is registered for. Thus, the FFN module 215N sends the fast failure notification message 274, which indicates a failure of the link 252, to the IGP module 210N. The IGP module 210N then updates the routing table and forwarding table as appropriate to reflect the failure of link 252. The FFN module 215N also floods the fast failure notification message 264 to the router 220A over the link 250. The fast failure notification message 264 can be forward before or concurrently with the forwarding of the fast forwarding message 274. Responsive to receiving the fast failure notification message 220A, the fast flooding mechanism 215A forwards the fast failure notification message 276 to the IGP module 210A so that the IGP module 210A can react to the notification and failure of the link 252.

In one embodiment, the fast failure notification messages 260, 262, and 264 are transmitted at the same speed as data traffic since they are processed at the data transport layer. By way of a specific example, the fast failure notification message 262 sent from the router 220C to the router 220N over the link 256 travels at the same speed as data traffic sent from the router 220C to the router 220N over the link 256. Since the fast failure notification messages 260, 262, and 264 travel at the same speed as data traffic, the next-hop router has the same amount of time for processing the notification message as the previous router, assuming the same computing power. For example, the router 220N has the same amount of time for processing the notification message 262 as the router 220C has for processing the notification message 260 assuming that the routers 220C and 220N have the same computing power.

It should be understood that the routers 220A-N do not converge at the same time. This is due to the propagation delay of the fast failure notification messages. For example, the router 220C will receive a fast failure notification message that indicates the failure of the link 252 before the router 220N receives a similar message. However, using the FFFC architecture described herein, the traffic loss stops immediately after the first router repairs. This is because the data traffic experiences the same propagation delay as the fast failure notification messages, which compensates the late starting of convergence at remote routers.

By way of example, assume that the routers 220A-N each have a convergence time of 50 milliseconds, and a transmission delay of 20 milliseconds over each hop. Convergence time is measured by dividing the number of lost packets with the traffic flow rate between any two routers in the domain. This should equal to the domain wide network convergence time if all the individual routers have the same computing power and the same convergence time. For example, upon the link 252 failure, the router 220B sends the fast forwarding notification message 260 (e.g., a Link State Update) to the router 220C and begins its convergence. Table 1 below shows the convergence timeline.

TABLE 1

| Node | Convergence Start | Convergence Completes |
|------|-------------------|----------------------|
| 220B | 0 | 50 ms |
| 220C | 20 ms | 70 ms |

At a time 0, the router 220B begins its convergence after the failure of the link 252. In addition, the router 220B concurrently sends the fast forwarding notification message 260 to the router 220C. During the first 50 milliseconds, packets from the router 220B to the router 220A over the link 252 are dropped (due to the failure of the link 252). The fast forwarding notification message 260 arrives at the router 220C after 20 milliseconds, at which point the router 220C begins its convergence. Thus, the router 220C begins its convergence before the router 220B finishes its convergence. The router 220C also sends the fast failure notification message 262 to the next hop router (e.g., the router 220N). Substantially immediately after 50 milliseconds and the router 220B has converged, the router 220B re-routes the packets that are destined to the router 220A towards the router 220C. Those packets take 20 milliseconds to arrive at the router 220C, and thus will arrive 70 milliseconds after the failure of the link 252. The router 220C converges 50 milliseconds after receiving the fast forwarding notification message 260, which is 70 milliseconds after the failure of the link 252. Thus, the data traffic packets will arrive at approximately the same time that the router 220C converges. This process continues domain-wide. Since the router 220C and all the other downstream routers converge one by one right before the data packets will arrive, the data packets arrive at the destination (the router 220A) via the corrected path successfully.

If the routers 220A-N have a different convergence time, micro-looping may form, although the packets will still be delivered after one or more loops. For example, assume the same link failure scenario (the link 252 has failed) but that the router 220C needs 90 milliseconds to converge while the other routers converge in 50 milliseconds. When the router 220B re-routes the packets to the router 220C at 70 milliseconds after the failure of the link 252, the router 220C will not have completed its updating yet. Thus, it may still be continuing to use its old forwarding table and send packets destined for the router 220A to the router 220B, which will in turn re-route those packets back to the router 220C. The time these packets will arrive at the router 220C is 110 milliseconds after the failure and the router 220C will have finished updating and will forward the packets correctly. In this example, the packets are looped once, however it should be understood that there may be multiple loops in some circumstances. Packets may be reordered due to the different convergence timeline causing packets to be temporarily forwarded in the wrong direction. Packet reordering affects TCP communication adversely in that new sequence numbered packets may arrive ahead of the older ones.

The FFFC architecture described herein, allows the data traffic to be re-routed as soon as the affected router converges, as opposed to all of the routers convergence. In addition, upon the convergence of the affected router, the FFFC architecture described herein guarantees correct routes for all affected traffic. The FFFC architecture described herein scales with networks of any size and any topology, at least not inferior to the normal IGP flooding.

Figure 3:
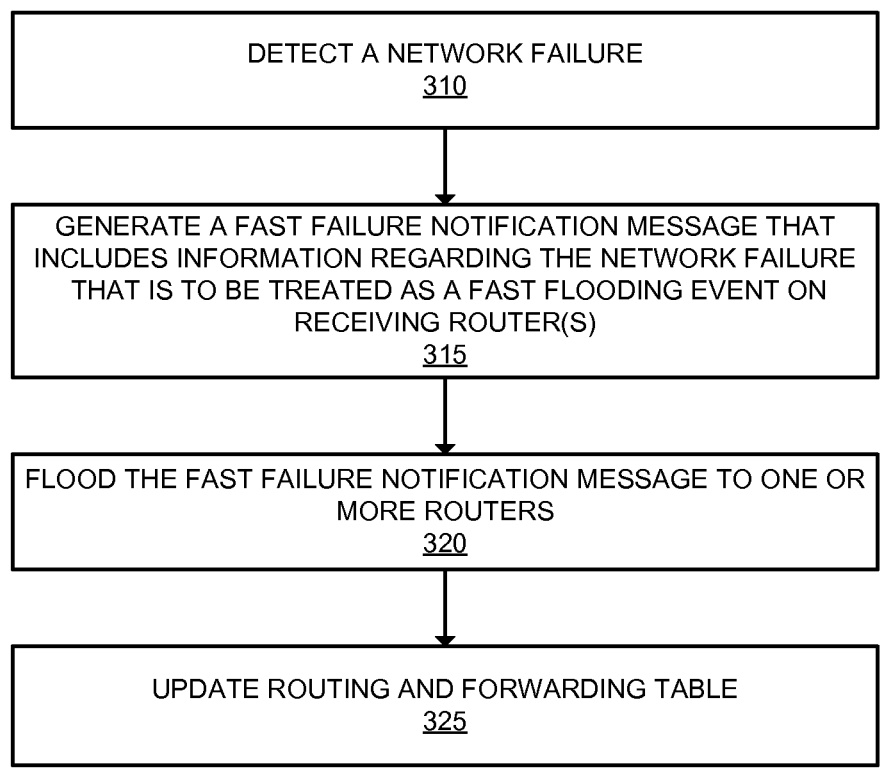
FIG. 3 is a flow diagram that illustrates exemplary operations performed by a router that detects a network failure to initiate the domain-wide FFFC according to one embodiment.

FIG. 3 is a flow diagram that illustrates exemplary operations performed by a router that detects a network failure to initiate the domain-wide FFFC according to one embodiment. At operation 310, the router detects a network failure. In one embodiment Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. Flow then moves to operation 315.

At operation 315, the router generates a fast failure notification message that includes information regarding the network failure. The fast failure notification message is to be treated as a fast flooding event on the receiving router(s). In addition, the fast failure notification message also indicates to the receiving router(s) that the fast flooding process should be performed including forwarding the fast failure notification message to their next hop(s) without waiting for convergence (without waiting for the routing and forwarding tables to be updated). For example, the fast failure notification message is to be forwarded by those router(s) without interaction from their application layer. In one embodiment, the fast failure notification message includes a specific destination IP address or MAC address that is dedicated for FFFC. Thus, the fast failure notification message includes information that allows the receiving router(s) to both update their routing and forwarding tables to reflect the network failure and that the fast failure notification should be forward to their next-hop router(s) independently of updating the routing and forwarding tables.

As described above, the fast failure notification message may use the existing IGP PDU packet format or may use a common message format regardless of protocol. Flow then moves to operation 320 and the router floods the fast failure notification message to one or more routers. Flow then moves to operation 325 and the router updates its routing table and forwarding table to reflect the network failure. After the router updates its routing table and forwarding table, the data packets will be re-routed to avoid the network failure.

The operation 325 may, in some embodiments, be started concurrently with the operation 315 and/or 320, however it should be understood that the updating is typically not completed until after the fast failure notification message is generated and transmitted. It should also be understood that the router does not wait until it is finished updating the routing table and forwarding table before generating and transmitting the fast failure notification message. Thus, generating and transmitting the fast failure notification message is performed independently of the updating of the routing and forwarding tables.

Figure 4:
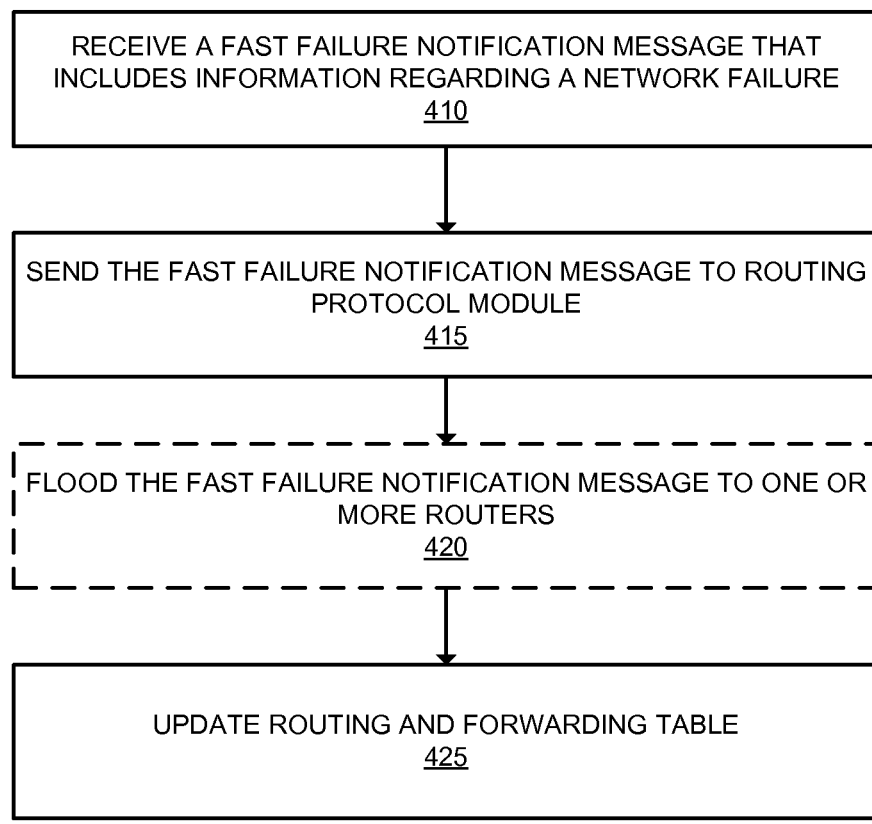
FIG. 4 is a flow diagram that illustrates exemplary operations performed by a router that receives a fast failure notification message according to one embodiment.

FIG. 4 is a flow diagram that illustrates exemplary operations performed by a router that receives a fast failure notification message according to one embodiment. At operation 410, the router receives a fast failure notification message that includes information regarding a network failure. The fast failure notification message also indicates that the message is to be treated in the FFFC architecture. For example, the fast failure notification message may include a specific destination IP address or MAC address that is dedicated for the FFFC described herein. Flow then moves to operation 415.

At operation 415, the fast flooding message is sent to the appropriate routing protocol module on the router (e.g., the IGP module on the router) for further processing. If the router includes next-hop router(s), flow moves to operation 420 and the fast failure notification message is flooded to the next-hop router(s). It should be understood that since this is a fast failure notification message, the router does not wait until it has updated its routing and forwarding table before flooding the fast failure notification message to its next-hop router(s). Flow then moves to operation 425 and the router updates its routing table and forwarding table to reflect the network failure. After the router updates its routing table and forwarding table, the data packets will be re-routed to avoid the network failure.

The operation 425 may, in some embodiments, be started concurrently with the operation 420, however it should be understood that the updating is typically not completed until after the fast failure notification message is flooded. It should also be understood that the router does not wait until it is finished updating the routing table and forwarding table before flooding the fast failure notification message. Thus, flooding the received fast failure notification message to its next-hop router(s) is performed independently of the updating of the routing and forwarding tables.

As described herein, the FFFC architecture detaches the forwarding of the network failure notification message from the application layer and moves it onto the data transport layer. As a result, control plane and data plane interaction is not required to forward the network failure notification message which reduces the time necessary for network-wide convergence, which minimizes the network down time in the event of a network failure.

As described herein, operations may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., router(s)). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a router for initiating fast flooding based fast convergence to recover from a network failure, the method comprising the steps of:
   detecting a network failure;
   responsive to the detected network failure, transmitting a fast failure notification message to a set of one or more routers before or concurrently of convergence of the router;
   performing the convergence of the router, wherein the fast failure notification message includes information that identifies the network failure and also indicates that the set of one or more routers floods the fast failure notification message before or concurrently of convergence of the set of one or more routers, wherein each of the set of one or more routers has registered to receive the fast failure notification message, wherein the convergence comprises updating a routing table to reflect the network failure and rerouting data packets using the updated routing table,
   and wherein the fast failure notification message has a common message format different from Interior Gateway Protocol (IGP) Protocol Data Unit (PDU) message format used for a normal IGP flooding protocol.

2. The method of claim 1, wherein the step of detecting the network failure is performed by one or more of: Layer-2 link-event monitoring and signaling, and Bidirectional Forwarding Detection (BFD).

3. The method of claim 1, further comprising the step of initiating the normal flooding of a message that indicates the network failure after the step of updating the routing table to reflect the network failure.

4. The method of claim 1, wherein the fast failure notification message includes a specific destination IP address or a specific destination MAC address that identifies it as a fast failure notification message.

5. A method in a router for participating in fast flooding based fast convergence to recover from a network failure, the method comprising the steps of:

receiving a fast failure notification message that includes information that identifies a network failure;

forwarding the fast failure notification message to a set of one or more routers before or concurrently of convergence of the router, wherein each of the set of one or more routers has registered to receive the fast failure notification message, wherein the set of one or more routers floods the fast failure notification message before or concurrently of convergence of the set of one or more routers wherein the convergence comprises updating a routing table to reflect the network failure and rerouting data packets using the updated routing table, and wherein the fast failure notification message has a common message format different from Interior Gateway Protocol (IGP) Protocol Data Unit (PDU) message format protocol used for a normal IGP flooding protocol.

6. The method of claim 5, wherein the fast failure notification message is identified through identification of a specific destination IP address or specific destination MAC address reserved for fast flooding based fast convergence.

7. The method of claim 5, wherein the step of updating the routing table includes the step of forwarding the fast failure notification message to an IGP module of an application layer of the router to update the routing table.

8. The method of claim 7, wherein prior to the step of updating the routing table, the IGP module foregoing an adjacency check to accept the fast failure notification message.

9. A router to initiate fast flooding based fast convergence to recover from a network failure, the router comprising:

a data transport layer including a Fast Failure Notification (FFN) module configured to, in response to a detected network failure, transmit a fast failure notification message to a set of one more routers before or concurrently of convergence of the router, wherein the fast failure notification message includes information that identifies the network failure and also indicates that the set of one or more routers floods the fast failure notification message before or concurrently of convergence of the set of one or more routers, wherein each of the set of one or more routers has registered to receive the fast failure notification message; and an application layer including a routing protocol module configured to perform the convergence by updating a routing table and rerouting data packet using the updated routing table in response to the detected network failure;

wherein the fast failure notification message has a common message format different from Interior Gateway Protocol (IGP) Protocol Data Unit (PDU) message format used for a normal IGP flooding protocol.

10. The router of claim 9, wherein the router is further configured to detect the network failure by one or more of: Layer-2 link-event monitoring and signaling, and Bidirectional Forwarding Detection (BFD).

11. The router of claim 9, wherein the routing protocol module is further configured to initiate a normal flooding of a message that indicates the network failure after the routing protocol module updates the routing table.

12. The router of claim 9, wherein the fast failure notification message includes a specific destination IP address or a specific destination MAC address that identifies it as a fast failure notification message.

13. A router to participate in fast flooding based fast convergence to recover from a network failure, the router comprising:

a data transport layer including a Fast Failure Notification (FFN) module configured to, in response to receipt of a fast failure notification message, perform the following:

transmit the fast failure notification message to a set of one more routers before or concurrently of convergence of the router, wherein the fast failure notification message includes information that identifies the network failure and also indicates that the set of one or more routers floods the fast failure notification message before or concurrently of convergence of the set of one or more routers, wherein each of the set of one or more routers has registered to receive the fast failure notification message, and perform the convergence of the router by transmitting the fast failure notification message to a routing protocol module on an application layer of the router; and the application layer including the routing protocol module configured to update a routing table and reroute data packets using the updated routing table in response to receipt of the fast failure notification message from the FFN module;

wherein the fast failure notification message has a common message format different from Interior Gateway Protocol (IGP) Protocol Data Unit (PDU) message format used for a normal IGP flooding protocol.

14. The router of claim 13, wherein the data transport layer is further configured to identify the fast failure notification message through identification of a specific destination IP address or specific destination MAC address reserved for fast flooding based fast convergence.

15. The router of claim 13, wherein the routing protocol module is further configured to forego an adjacency check on the fast failure notification message that is to be received from the FFN module.

* * * * *